Sept. 15, 1970     W. W. BUECHNER     3,528,760
METHOD AND DEVICE FOR THE TREATMENT OF PAPER-BACKED
PHOTOGRAPHIC SHEET MATERIALS
Original Filed Feb. 4, 1964     2 Sheets-Sheet 1
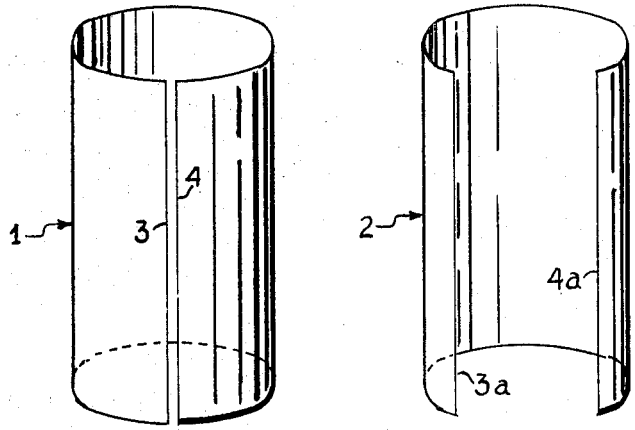
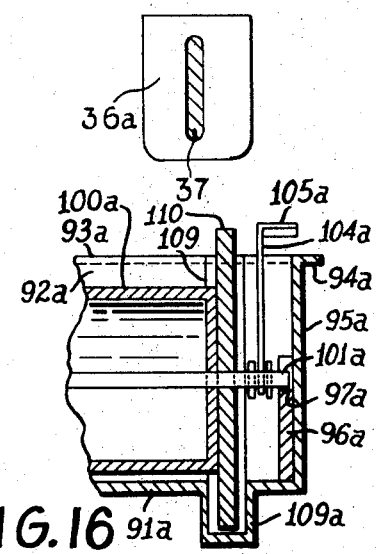
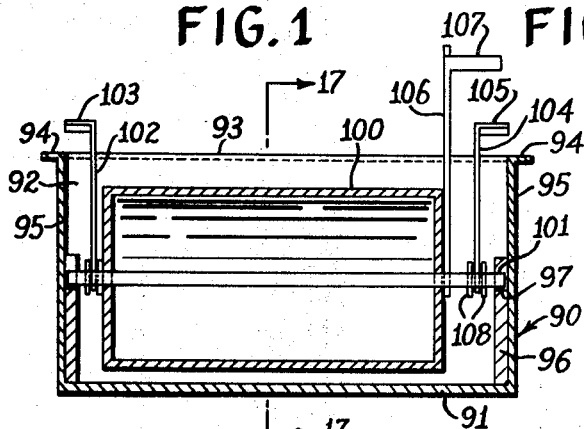
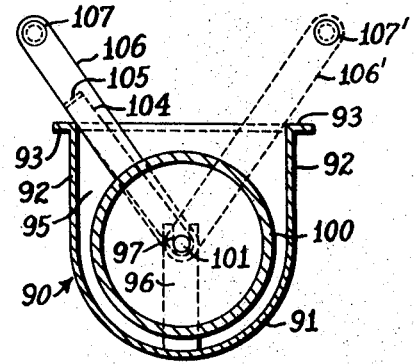
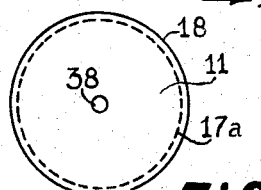
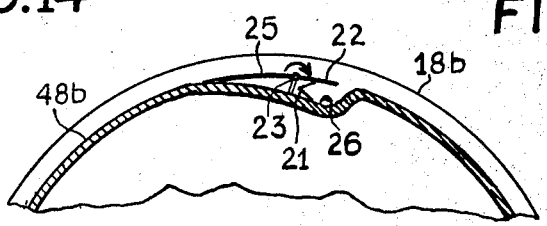
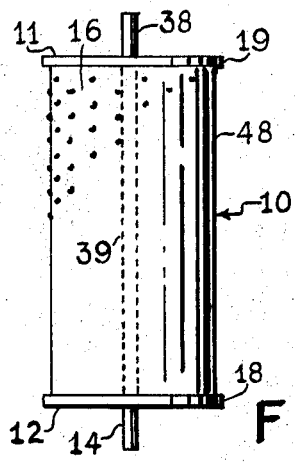
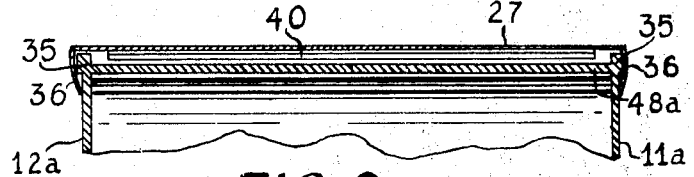
INVENTOR.
Werner W. Buechner

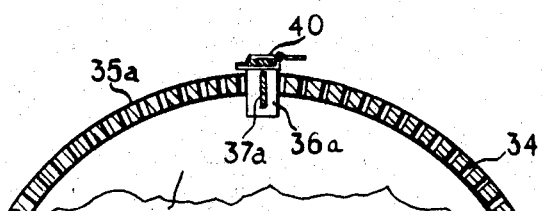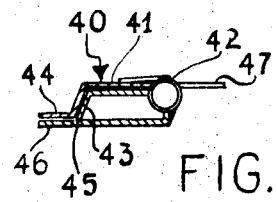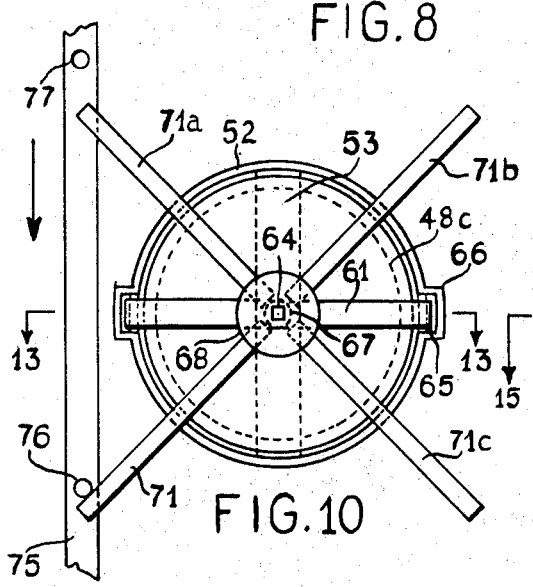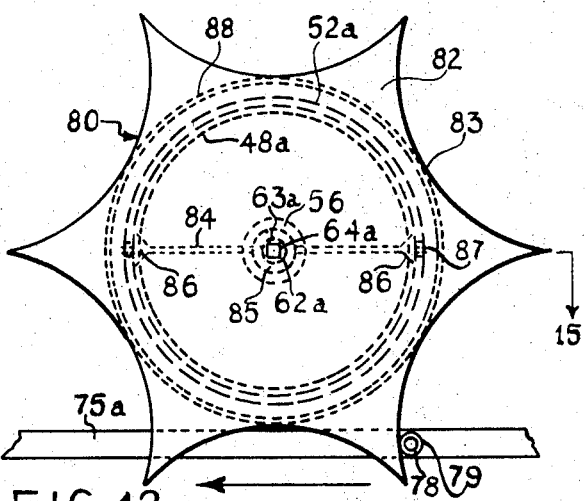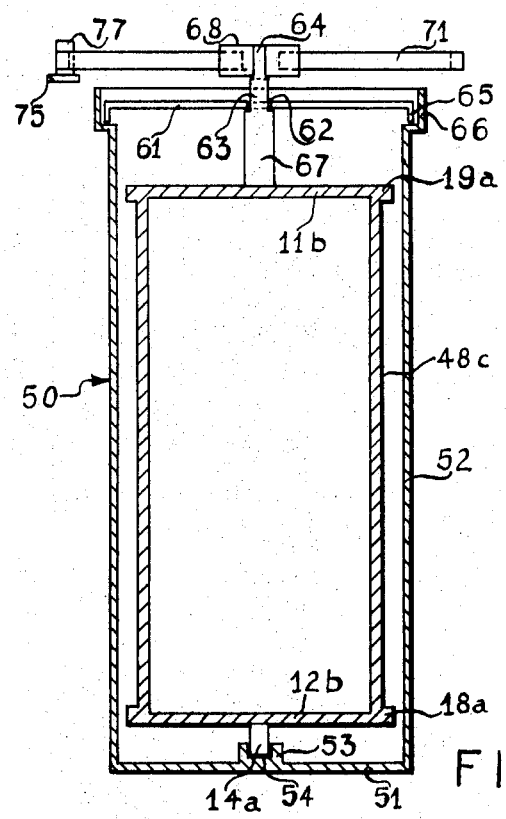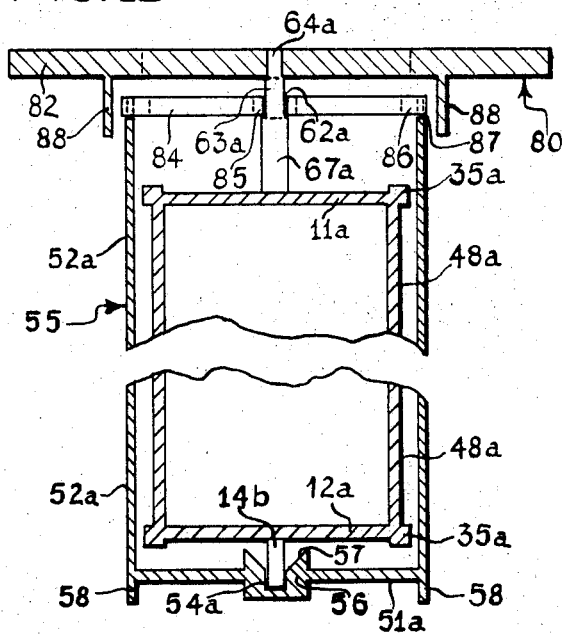

United States Patent Office 3,528,760
Patented Sept. 15, 1970

3,528,760
METHOD AND DEVICE FOR THE TREATMENT OF PAPER-BACKED PHOTOGRAPHIC SHEET MATERIALS
Werner W. Buechner, 4407 Gladding Court, Midland, Mich. 48640
Application Oct. 8, 1964, Ser. No. 402,545, which is a division of application Ser. No. 342,459, Feb. 4, 1964. Divided and this application Dec. 26, 1967, Ser. No. 693,256
The portion of the term of the patent subsequent to Nov. 18, 1985, has been disclaimed
Int. Cl. G03d 3/08
U.S. Cl. 95—93                                  10 Claims

ABSTRACT OF THE DISCLOSURE

Paper-backed photographic sheet materials are wet treated on a rotating, horizontally oriented drum, whereby the sheet is held stationary in form of a partial cylinder on said drum with at least one reactive layer disposed toward the drum, and the treating liquid is moved to and by the reactive layer of said stationary sheet and an apparatus, in which a surface modified drum is mounted rotatably, around its horizontal cylinder axis, for the reception of a stationary, partially cylindrical paper-backed photographic sheet, held thereon by holding means, for wet treatment of at least one reactive layer contained on the concave side of said sheet.

---

The present application is a division of my copending application Ser. No. 402,545, filed Oct. 8, 1964 for "Cylindrical Carrier For Photographic Sheet Materials," which in turn is a division of my application Ser. No. 342,459, filed Feb. 4, 1964 now Pat. 3,349,686, which latter application is in turn a continuation-in-part of my application Ser. No. 23,313 filed Apr. 19, 1960, now Pat. 3,124,051 and of my application Ser. No. 52,524, filed Aug. 29, 1960, now Pat. 3,236,649.

This invention relates to novel method, device and apparatus for the treatment of paper-backed photographic sheet materials, and more specifically to the wet treatment of photographic papers having at least one reactive layer, particularly of color printing papers.

The abovesaid applications disclose and claim novel process, apparatus and device which is adapted to be used in the treatment of photographic materials and especially in the development and other treatment of paper-backed sheet materials and especially of multilayer color printing papers. For the support of the flexible paper-backed sheets during the treatment, cylindrical carriers or drums or supports are used, which permit the treatment of said sheet material in vertical or in horizontal orientation while the sheets are given a cylindrical configuration.

It is an object of the present invention to provide a new method for the wet treatment of photographic paper-backed sheet materials and especially of color printing papers, in which the said sheet is held stationary and the treating liquid is moved in relation to the stationary sheet.

It is another object of the present invention to provide a new method for the wet treatment of paper-backed photographic sheet material having at least one reactive layer, in which the stationary sheet material is contained on a rotating drum for high agitation levels during the said treatment.

It is another object of the present invention to provide a new method for the wet treatment of paper-backed photographic sheet materials, in which the sheet is contained on a horizontally oriented cylindrical support in form of an at least partial cylinder, such that the photographic treating liquid has access to the concave side of said cylindrical sheet.

Another object of the invention is the provision of a new method which is adapted to be used with particular advantage for the treatment of photographic color materials in multistep developing and/or aftertreating processes by professional or amateur photographers.

Still another object of the invention is the provision of a novel carrier for photographic paper-backed sheet material, which carrier has a modified cylindrical surface for most effective treatment of the photographic sheet.

A further object is the provision of a novel apparatus which is particularly adapted for the wet treatment of paper-backed sheet materials and especially of photographic color printing papers.

Other objects of the invention will become apparent from the attached drawings and from the following detailed description of the invention.

The objects of the invention are achieved by a method which comprises the steps of depositing a sheet of paper-backed photographic material, in form of a partial cylinder, with at least one reactive layer on the concave side, onto a cylindrical support which is rotatable around its horizontal cylinder axis, the step of holding said sheet stationary and the step of moving a photographic treating liquid relative to said stationary sheet and in contact with said reactive layer for uniform treatment of all areas of said sheet material. The cylindrical support is contacted with said treating liquid and the support is unidirectionally rotated around its cylinder axis during treatment. The convex cylindrical surface of said cylindrical support is preferably modified, e.g. by the provision of a pattern of protrusions or indentations which are small in relation to the size of the drum and which are arranged in a plurality of rows, each of which comprises a plurality of protrusions or indentations, such that the treating liquid has access to the concave side of said partially cylindrical sheet and to all areas of the reactive layer or layers contained on the concave side of the sheet.

Accordingly, the objects of the invention are furthermore achieved by the provision of a cylindrical support or carrier for flexible photographic sheet materials which comprises a cylindrical member and means adapted to rotationally support the cylindrical support or carrier. The cylindrical support or carrier of the invention may be a closed drum or it may be open on one or both of the circular faces. The outer convex surface of the cylindrical wall of the cylindrical carrier or support may be smooth or it may with advantage be provided with a multiplicity of protrusions or indentations or the like, forming a pattern all around the convex side of the cylindrical support.

The circular ends of the cylindrical wall may be provided with rims or guide means, respectively. The cylindrical support or carrier is advantageously provided with holding means adapted to hold or support the cylindrical sheet of photographic material on the cylindrical wall of the support or carrier.

The preferred embodiment of the cylindrical support comprises a cylindrical member, the outer convex surface of which is provided with a pattern of protrusions indentations so as to permit access of treating liquid to the concave side of the cylindrical sheet of photographic material while it is contained on said support.

Further embodiments and modifications of the cylindrical carrier or support of the present invention are described in the following detailed description of the invention and in the accompanying drawings, wherein:

FIG. 1 represents a perspective view of a full cylindrical sheet and FIG. 2 depicts in perspective a partial cylindrical sheet.

FIG. 3 is a plan view of the top and FIG. 4 is a side elevation of a drum-type closed support of the invention.

FIG. 5 is a sectional view of a portion of a drum-type support cut perpendicularly to the central axis.

FIG. 6 is a coaxial section of a portion of a drum-type support and of the clamp contained thereon.

FIG. 7 is an elevational side view of the outer perpendicular extension of the clamp shown in FIG. 9.

FIG. 8 is an elevational view of a portion of another modification of the closed drum-type support.

FIG. 10 is a plan view and FIG. 11 a vertical section of an upright vessel which is adapted to receive the support of the invention and cylindrical sheet contained thereon for the photographic treatment.

FIG. 12 is a top plan view and FIG. 13 a vertical section of another modification of the upright vessel and cylindrical support with a driving gear attached to the support.

FIG. 14 is a sectional view and FIG. 15 a transversal vertical section of the horizontal trough.

FIG. 16 depicts a vertical section of a portion of another modification of the horizontal trough.

The novel cylindrical support of the present invention may be widely used in photographic liquid treatments and especially in the development and fixing of flexible photographic positive and negative sheet material such as films, reversal films and paper base materials. The cylindrical support of the present invention is especially useful and beneficial in the application to the more recently introduced photographic color processes and it is particularly adapted to the processing of color positive and negative multilayer color sheet and cut films as well as to the processing of multilayer positive color printing materials in sheet or cut form particularly those on a paper base such as Kodak Ektacolor paper (formerly called type C positive printing paper). My invention includes many modifications of the cylindrical support which make it particularly suited for application in the said multistep color developing processes.

Prefatory to a detailed description of the invention some of the more important terms used herein will be explained in order to provide a better understanding of the nature of the invention and of its scope.

The cylindrical support of the present invention is primarily adapted for the treatment of photographic sheet materials, i.e. such materials which have definite size limitations. The sheets may be square or rectangular pieces of photographic material. Generally one dimension in the plane of the photographic sheet materials is larger than the second dimension. This applies particularly to the commercially sold photographic sheet materials which mostly have an oblong shape with somewhat greater length than width. The two dimensions may differ by an amount which is in the range from 10 to 50 percent of that of the shorter dimension. In exceptional cases the longer dimension may be up to twice the length of the shorter one and even a small multiple of the smaller dimension e.g. up to 3, 4 or 5 times the length of the smaller dimension.

The photographic sheet material may be of any desired nature or composition and may serve any desired purpose. It may be positive or negative or reversal material, black and white or color, single layer or multilayer. It may be contained on any desired flexible base material. To mention a few, the base may be cellulose acetate, nitrocellulose, polyester such as poly (ethyleneterephthalate) or paper. The base may be opaque or transparent as the case may be. As stated hereinbefore, the carrier or support of the invention is particularly adapted to be used in the practice of the positive color printing processes such as the processes recommended for the printing of color negatives on Kodak Ektacolor paper, where it offers the greatest and most striking advantages and benefits over the support of the prior art.

The term "treating liquids" comprises a multitude of liquid media which are capable of accomplishing a desired change or alteration in the photographic sheet material. They are mostly aqueous solutions containing in a dissolved state suitable chemicals or combinations of chemicals which are capable of developing latent pictures or designs contained in the light sensitive layer, or layers, of which are capable of fixing, bleaching, stabilizing, buffering, or performing many other photographic steps. They may also be used to deposit certain chemicals on or in the sheet materials (in the photographically active layer or layers or in the base), such as dyes, metals or metal ions, couplers and other organic intermediates, or they may be capable of dissolving or removing one or more constituents or impurities contained on or in the sheet material or in the photographically active layer or layers. Thus, also water (tap water or distilled water) with or without suitable additives is, for the purposes of the present invention a treating liquid. Sometimes also organic solvents or other non-aqueous liquids may be the main constituent of the treating fluids useful in this invention.

The terms "cylindrical configuration" or "circular configuration" as used herein mean that the sheet material is formed into a full or complete cylinder or cylinder plane respectively, with the limitation that the usable area of the material (the area covered by a photographic—latent or actual—representation, design, pattern etc.) forms the plane of the cylinder without substantial overlapping. If two opposing or "vicinal" edges of the sheet material (or its useable area respectively) touch each other or are lying in the same radial plane the cylinder is for the purposes of the invention full or complete. However, the cylinder may also be incomplete, leaving a gap of any desired width between the two opposing or vicinal edges which lie in or close to the cyliṅderical plane. Sheet material covering only three quarters or down to one half or one quarter or less of the circumference of the cylindrical plane are still within the meaning of the term. As stated there should be no substantial overlapping of the ends of the material, and particularly any of the spiral configurations, wherein the photographic material forms a continuous spiral with a multiplicity of overlapping layers are not comprised in the definition "cylindrical configuration" as used herein.

The terminology "substantially cylindrical" is meant to comprise also such configurations which deviate in some minor way from the ideal cylindrical configurations of the sheet material. So, for instance, may the circular or cylindrical configuration be modified to form a prism, the cross section of which may be a regular or irregular polygon such as a hexagon or octagon. The prismatic forms should pereferably be shaped such that their edges paralleling the length axis fall readily into a cylindrical plane of similar dimensions. The term "substantially cylindrical" comprises furthermore such forms which are derived from an ideal cylindrical configuration by deformation such as in configurations having an oval cross section. Similarly, it comprises cylindrical configurations which have been deformed by deflection of one or both vicinary edges of the sheet out of the cylindrical plane. The latter deviation or modification of the substantially cylindrical configuration is of particular importance in the practical operation of the invention, as will be described and shown hereinafter in more detail.

The terminology "maintaining the cylindrical configuration" is meant to denote that no substantial changes of the cylindrical or substantially cylindrical configuration, as defined above, should be permitted to occur or to be made during the treatment in the liquid medium. It cannot always be avoided that slight deformation takes place, as by the fact that the sheet material may change its dimensions when it is contacted with the treating liquid. This is particularly true with paper base materials which have a tendency to expand and swell when they are contacted with water or aqueous liquids. The deformation caused by the extension or shrinkage of the sheet material is tolerable and does not negatively affect the operation of the invention and is therefore to be considered as falling within the realm of the terminology "maintaining the configuration".

It need not be mentioned that generally all areas of the sheet material must be contacted with the treating liquid in order to achieve uniform results. This does, however, not mean that it is necessary in all cases to completely submerge the cylindrical sheet material into the treating fluid when it is processed in accordance with the present invention. The cylindrical sheet material may be submerged in part only, if the cylinder axis is positioned horizontally or substantially horizonaly. As is readily apparent, submersion of a small portion of the "horizontal" cylinderical sheet material will, upon rotation of the cylinder around its length axis, successively provide contact of each section of the sheet material with the treating liquid. Continuous rotational movement thus permits effective treatment of all areas of the sheet of photographic material due to its substantially cylindrical configuration. This mode of operation will be preferred, however, only if the treating fluid or the treated photographic layer or layers are not sensitive to air, particularly to oxygen which in some photographic processes would affect the photographic layer and/or the treating fluid contained thereon or therein, causing cloudiness or discoloration of the picture area or other undesirable effects and side reactions.

The cylindrical sheet material may be inserted into the treating liquid in any desired orientation. For many applications a substantially vertical orientation of the cylinder axis is preferred.

The sheet material having the cylindrical or the substantially cylindrical configuration, as described hereinbefore, will be called in the following discussion "cylindrical sheet." FIG. 1 of the accompanying drawings shows in perspective cylindrical sheet 1 wherein vicinal edges 3 and 4 nearly touch each other. This sheet thus forms a substantially full or complete cylinder. FIG. 2 shows in perspective cylindrical sheet 2 wherein vicinal edges 3a and 4a are also located in the cylindrical plane but are separated by a considerable gap. This sheet thus is a partial cylinder covering only part of the cylindrical plane.

The cylindrical support of the invention comprises the drum-like or other cylindrically shaped structures, which may or may not be open on one or both cylindrical ends. However, it is preferred in accordance with the invention, to employ a closed drum-like cylindrical structure as the supporting means for the cylindrical sheet. Both circular ends of this drum-like structure are closed such that the treating liquid has no access to the interior inside of the drum. The closed drum of this type, which will be called hereinafter "drum-type support" is shown in FIGS. 3 and 4 of the accompanying drawings. FIG. 3 is a plan view of the top and FIG. 4 is a side elevational view of drum-type support 10. This support comprises the cylindrical wall 48 and the circular top and bottom wall sections 11 and 12 which are joined to the edges of cylindrical wall 48 to form a closed structure. Axle 39 extends through the center of top and bottom sections 11 and 12 and through the entire length of the cylinder, coinciding with its rotational axis. Axle stump 38 extends, outside the cylinder, upwards and axle stump 14 correspondingly downwards both in the direction of and coinciding with the rotational axis of the cylinder. Both circular ends of the cylindrical wall 48 are provided with rims 18 and 19 respectively. The outer convex surface of the cylindrical wall of the drum-type support may be smooth or it may be provided with a multiplicity of protrusions such as raised dots or welts. Pattern 16 of raised dots is shown in the upper left hand corner of the cylindrical wall in FIG. 6. In the alternative one may employ a pattern of indentations or the like. These surface modifications of the cylindrical wall of the drum-type support are intended to permit access of the treating liquid to the back side or concave side of the cylindrical sheet contained thereon, if this is desired.

Generally, it is desirable that the closed drum-type support is made heavy enough to sink in water and particularly in the treating liquids of the highest density with which it might be used. Advantageously, its specific weight should be substantially higher than 1 g./ccm. and preferably at least 1.5 g./ccm. and sometimes even higher than 2 g./cm. In order to sink and remain submerged in concentrated salt solutions, particularly in the concentrated fixing baths which may be used in some processes. The required weight of the support may be supplied by the use of heavy metals as construction materials and/or by the inclusion of extra solid or liquid ballast in the hollow interior of the closed cylinder, e.g. of water, or iron or lead weights. If the weighting of the drum-type support is not desired, it may be pressed into the liquid and held in its submerged position by the application of a downward pressure. This may be accomplished by temporarily connecting some part of the support with the wall or bottom of the vessel wherein the treating liquid is contained.

It need not be mentioned that it is generally preferred that the sheet material is bent onto its support and especially onto the drum-type support in such manner that the photographically active layer or layers of the sheet material form the convex outside of the cylindrical sheet. This precaution insures that the treating liquid has free access to all parts of the area to be treated, when the cylindrical sheet is immersed or contacted with the treating liquid. Thus an even, uniform treatment of the whole area of the active layer or layers is achieved without the danger of local undertreatment and the resultant faults in the final negative or positive materials. Whether or not preference is given to the flat smooth drum-type support or to the corrugated or dotted modification of the drum depends in part on the nature of the materials and processes used.

The foregoing explanations suggest that photographic materials having one or more active or reactive layers on one side of the sheet only are usually more conveniently processed by the process and in the apparatus of the invention than those materials which have such layers on both sides. However, the dotted or corrugated version of the drum is suitable to sometimes permit trouble-free treatment of the latter kind of materials, particularly if the treatment of the layer contained toward the support is not too critical as is the case, for instance, when a layer of dye is to be leached out. The treating liquid usually penetrates into the portions of the layer which are covered by the tiny supporting dots and readily remove the substances and compounds by diffusion and leaching.

The cylindrical sheet may be fastened to the supporting structure in any suitable manner. Pressure sensitive tapes which are adhesive on both sides may be applied to the concave back side of the material in the area of the vicinal edges 3 and 4 (or 3a and 4a) of the cylindrical sheet, if the active layer or layers to be treated in the processing liquids are contained merely on the convex side. The underside of the adhesive strips (which adhere to the back of the sheet material) may then be fastened to the drum-type support by the application of slight pressure over the edges of the cylindrical sheet above the location of the adhesive strips. After completion of the treatment the cylindrical sheet material can be readily removed by peeling it off the drum surface. With this modification there is no need for a subsequent removal of the adhesive tape from the back of the sheet material if the tape is desired to provide the adhesive for the later mounting of the finished print or other product on suitable background material.

In the alternative two adhesive tapes which are provided with an adhesive layer on only one side can be applied (with the adhesive side down toward the sheet)

to the face of the sheet along the vicinal edges of the cylindrical sheet such that narrow sections of the adhesive strips extend over the unused edge of the sheet material. The protruding portions of the adhesive tape can then be fastened to the drum surface by the application of slight pressure. Aftetr completion of the treatment the edges of the sheet material with the tape adhering thereto may be simply cut off. It need not be mentioned that the adhesive tape should be inert to the treating liquids used and vice versa.

A more generally applicable and more satisfactory method and mode of fastening the cylindrical sheet to the drum-type support avoids the use of adhesive tape altogether. In this preferred modification of fastening the cylindrical sheet to the support and particularly to the drum-type support spring loaded clips or clamps are employed. An embodiment of this modification is shown in FIGS. 5 to 9 of the accompanying drawings. FIG. 5 is a sectional view of a portion of a drum-type support which was cut perpendicularly to the central axis. A spring loaded clamp 25 is fixedly provided, recessed in transverse indentation 26 of the cylindrical wall 48b. Indentation 26 extends over the entire length of the cylindrical wall 48b in parallel alignment with the central axis of the cylinder. It terminates at each end at the inside of the circular faces of the drum and of the rims 18b and 19b, respectively (the latter is not shown). Clamp 25 which extends over nearly all the length of the indentation comprises supporting member 23 and pivotally secured to the upper end of the support flat clip 25 which is held depressed onto the convex side of cylindrical wall 48b by spring 21. The clamp may be opened to receive or release the edge of a sheet of photographic material by depressing lever member 22. A second spring loaded clamp may be provided in another recess or indentation of the drum-type support in similar manner, or it may be removably fastened to the drum-type support in such manner that it can be displaced or moved around the cylindrical wall and locked in place in any desired position around the periphery of the cylindrical support.

A preferred embodiment of the removable clamp and means for fastening it on the support is shown in FIG. 6 of the accompanying drawings. FIG. 6 is a coaxial section of a portion of a drum-type support and of the clamp contained thereon. Rims 35 encircle the edges formed by cylindrical wall 48a and circular end sections 11a and 12a respectively, of the closed drum-type support. Clamp 40 is fastened on band 27. Both ends of band 27 are bent downwards to form the vertical elastic and curved sections 36 which by virtue of their elasticity press against the outer periphery of rims 35 and against circular walls 11a and 12a thus holding, by frictional forces band 27 and clamp 40 in a fixed position when it is slipped over rims 35 of the drum-type support.

The band 27 with its elastic angled extentions and the sheet holding clamp thereon may readily be removed and reinserted at any desired point around the periphery of the cylindrical support. Clamp 40 is shown in FIG. 6 located underneath band 27. Sometimes it will be desirable to locate the clamp on the upper side of band 27.

Elastic, vertical extensions 36 of band 27 are angled downwards by an angle which is approximately 90°. FIG. 7 is an elevational side view of extension 36a which has in its center a vertical indentation or welt 37 and a corresponding narrow, elongated protrusion on the backside of extension 36a facing rim 35 when band 27 is inserted, and pointing radially toward the axis of the drum-type support. This is shown in more detail in FIG. 8 which is an elevational view of a portion of the outside of circular wall 12b and rim 35a of another modification of the closed drum-type support. Rim 35a has been provided with indentations 34 which are of a size suitable to accommodate the protrusion underlying welt 37a and which are arranged radially around the rim in narrow, even spacing over the entire radial width of the rim.

Band 27 with clamp 40 joined thereon is shown inserted onto the cylindrical support, elastic vertical extensions 36a engaging over rim 35a and the protrusion opposite welt 37a lying in one of the indentations 34. This modification of the drum-type support has the added advantage that adjustable clamp 40 cannot be accidentally displaced in the direction of the periphery during the treatment of the cylindrical sheet or during handling of the support.

Clamp 40 which may also be employed instead of the fixed clamp 25 of FIG. 5 is shown in an enlarged sectional side view in FIG. 9. The clamp comprises as the principal components base 45, spring 42 and the upper holding member 41. The base forms in section a trapezoid with an extension of the base of the trapezoid to the left, the extension forming the lower claw 46. The upper member 41 is pivotally mounted in the right upper corner of the trapezoid, together with spring 42, and follows the contours of the upper horizontal side and the left slanted side of the trapezoid and finally of the lower claw 46 thus forming upper claw 44 which is normally pressed against lower claw 46 by the action of spring 42. The clamp can readily be opened by depressing lever 47 which is formed by an extension of the upper holding member 41 to the right. The left, slanted side of the trapezoid forms stop 43 which prevents the vicinal edge of the cylindrical sheet material inserted therein from sliding into the clamp by more than a predetermined narrow distance.

The strip of material along the vicinal edge which is permitted to be covered by the upper clamp member or claw is usually kept as narrow as possible, the only criterion being that a firm, secure grip is assured. Thus only a minimal portion of the sheet material, usually no more than about one millimeter to several millimeters wide, is covered and thus protected from the action of the treating liquid during processing. The narrow, untreated strips may be removed from the finished sheet, for instance by cutting them off. The removal of any part of the sheet after completion of the treatment may, however, be unnecessary, if one or both claws of each clamp or slip are provided on their sides facing each other with small protrusions and especially with a row or pattern of dot-like protrusions which make contact with the surface of the clamped-in vicinal edges of the cylindrical sheet. With sufficiently high pressure exerted by the springs or similar means, the cylindrical sheet will be securely held in place, while the minute areas covered by the protrusions will be reached by the treating liquids, by penetration or diffusion: If the usual white unexposed edges are provided all around the sheet material, the contact points should fall into this narrow strip. Any undertreatment of the contact points would generally be of no detriment to the finished product. If in exceptional cases treatment faults should become apparent during extended storage the unexposed edge may simply be cut off all around with no damage to the useful picture area.

Any other type of clip or clamp may be employed, preferably with suitable adjustments having been made to provide for the special requirements of the process and apparatus of the present invention. One or more clips or clamps may be used to hold each of the vicinal edges of the cylindrical sheet. They may be narrow clips extending over a width of an inch or less in the direction of the length axis of the cylinder or they may be of the wider variety, extending over a substantial portion of the cylinder axis and preferably over nearly the whole width of the cylindrical support. The clips or clamps may be fixedly attached at such positions around the periphery of the drum that they accommodate the maximum size of sheet material for which the cylindrical support is designed. However, in order to render the apparatus flexible and capable of accommodating any desired size of sheet material which is smaller than the maximum size at least one or one set of the clips or clamps should be removable and adjustable so that it can be moved around at least a portion of the periphery of the cylindrical support, as has been described hereinbefore. The clips or clamps may also be slidably mounted on one or more circular guides provided around one or both ends of the cylindrical support and other provisions for temporarily arresting or locking the movable clips or clamps in any desired position around the periphery may be included in the design.

As stated hereinbefore, it is preferred to employ in the operation of the process of the invention the cylindrical support, and particularly the closed durm-type support which uses one of the stationary clamps recessed in the cylindrical plane or wall and one or one set of the clamps or clips of the removable or adjustable type.

The sheet material may be applied and fastened to the drum-type support by inserting and securing one vicinal edge of it in fixed clamp 25. The sheet is then given its cylindrical configuration by bending it downwards against and around the cylindrical support. Adjustable clamps 40 is then moved along the periphery of the drum to a distance from the fixed clamp which permits insertion of the opposite edge of the sheet in the opened clamp 40 which is thereafter closed and moved away from the sheet material to lay it close to the surface of the cylindrical supporting wall. In the alternative clamp 40 may be removed and clamped onto the free vicinal edge of the cylindrical sheet and fastened to the cylindrical support by snapping the vertical elastic extensions 36 of the band 27 over rims 35.

The fixedly joined or attached clip or clamp may be omitted, if in its stead a narrower slot, extending over all or nearly all of the width of the drum-type support, is provided in the cylindrical surface of the drum. The slot is located parallel to the cylindrical length axis on or near the surface of the cylindrical plane of the drum. One of the vicinal edges of the cylindrical sheet is slipped into the slot. A stop provided inside the slot prevents the sheet material from sliding in by more than a predetermined amount. Preferably the depth of penetration is kept very small, for instance, one half up to a few millimeters. The slot is closed to the interior of the drum in the case of the closed type drum to prevent entrance of the treating liquid into the interior of the drum.

In another modification of the drum-type support ring-like slots are provided at or near both outer circular edges of the drum all around the periphery of the drum such that the circular edges of the cylindrical sheet are slipped into the circular slots, holding the sheet material securely in place during the treatment, thus eliminating the need for clips or clamps. The insertion of the cylindrical sheet in the circular slots is facilitated and varying sizes of sheet material can be processed on one and the same support if at least one of the circular slot arrangements is mounted slideably in the direction of the cylinder axis with a provision to lock it in place in any desired position after the insertion of the cylindrical sheet. Any other desired arrangement to hold the cylindrical sheet securely in place during the treatment in the processing liquids may be used.

The drum-type support and particularly the closed drum-type support mentioned hereinbefore can be used with particular advantage in a modification of the invention which employs as the container holding the treating liquid or liquids a cylindrical or partially cylindrical tank or vessel. The cylindrical vessel is preferably used in an upright position such that the cylinder axis is in a vertical orientation or at least substantially in this position. Its inside diameter is advantageously only slightly larger than the diameter of the cylindrical sheet or its support which is to be submerged in the cylindrical vessel. The diameter of the inner circular wall of the vessel may be up to one third or more larger than that of the cylindrical support and is preferably exceeding it by one thirtieth to one tenth. The height of the vertical cylindrical wall of the vessel is exceeding that of the cylindrical support, preferably by a substantial amount, which may range from a small fraction to one twentieth and up to one half or more of the total height of the cylindrical support. This type of vessel will be called hereinafter the "upright vessel."

One modification thereof with a closed drum-type support inserted therein in operating position is shown in a plan view (top) in FIG. 10 and in vertical section taken along lines 13 of FIG. 10 in FIG. 11 of the accompanying drawings. The upright vessel 50 comprises as the substantial elements circular bottom 51 and extending rectangularly upwards from the edge of the bottom vertical cylindrical wall 52.

If the closed type drum is used in combination with the upright cylindrical vessel and if the relative dimensions are falling within the ranges given hereinbefore, only a relatively small amount of treating liquid is required to fill the narrow space left between the circular wall 52 of the cylindrical vessel and the cylindrical wall 48c of the drum-type support and the cylindrical sheet of photographic material contained thereon (not shown). Small additional amounts of the treating liquid may be required to fill the bottom portion of the vessel between the bottom 51 of the vessel and the lower circular wall 12b of the support if the drum-type support is not completely lowered to the bottom of the vessel. An additional amount of the treating liquid may be present in the portion of the vessel above the upper circular wall 11b of the support, to assure complete submersion of the cylindrical sheet and of its support as the case may be. Only a fraction of the treating liquid, normally required in the conventional tank or tray development of the same size sheets, is required with the expedient of this invention, of employing the combination of the cylindrical sheet with the closed drum-type carrier and the upright cylindrical vessel. The saving in the amount of treating liquid required for each individual treatment of the photographic sheet material is of particular importance if only one or a small number of sheets are to be treated at one time or in one session with processing liquids which cannot readily be stored without being subject to deterioration or other undesirable changes.

In its application to the color processing techniques the cylindrical vessel is thus with advantage designed and dimensioned such that it accommodates an amount of the treating liquid (when the closed drum is inserted) which will safely process only the small number of sheets of the color material which is usually processed in the short sessions, say four, five or six sheets of the maximum size for which the apparatus is designed. If more than this predetermined number of sheets is to be processed, the liquid may be simply discarded and fresh liquid is placed into the vessel, or it may be replenished by the addition of the chemicals provided for this purpose. In multistep processes each vessel may be dimensioned for the particular effectiveness and treating capacity of the liquid for which it is designed, so that after each session or after the treatment of the predetermined number of sheets all the solutions or processing liquids used in the particular process may be discarded. This expedient has the additional advantage—aside from the savings possible by the complete exhaustion of each of the processing liquids to their safe limits— that always fresh processing liquids are used. This is an important factor in achieving absolute reproducibility of the results, particularly in the complex and sensitive color developing processes. It removes the need for the storage of partially used liquids in separate containers, or the risk of contamination and spoilage prevailing when the used portions of the treating liquids are poured back into the containers containing the supply of the fresh solutions. Thus the above described arrangement and steps of the present invention contribute considerably to the simplification of complex, multistep photographic processes and particularly also of the multi-step color developing methods presently in use.

The following example demonstrates the requirements of processing liquid in a practical application of the cylindrical upright vessel is combination with the closed drum support containing the cylindrical sheet. The data are given in approximation and rounded figures and apply to a vessel and support accommodating an 8 x 10 inch sheet. Specifically, the data have been applied to the first developing step in the Kodak Ektacolor Paper printing process. This process is described in detail in the Kodak Publication No. EX66 (Printing Color Negatives), first edition, 1958. According to this publication three and one half gallons of the first developing solution are capable of developing 90 sheets of the 8 x 10 inch size without the use of replenishers. Replenishment extends the capacity to 390 sheets of the same size. Correspondingly, approximately 150 ccm. of the solution are required for the development of one sheet of this size without the use of replenishers. The cylindrical wall of the closed drum-type support for the cylindrical sheet has a diameter of approximately 8.5 cm. and a length of approximately 20 cm. The upright cylindrical vessel has an inner diameter of approximately 11 cm. The developing solution stands, with the drum inserted in operating position, approximately 22 cm. high, leaving about one cm. each at the bottom and at the top beyond the lower and upper end of the drum. Approximately 930 ccm. of the liquid are required to fill the vessel (with the drum and cylindrical sheet contained therein) to the indicated height. The amount of liquid permits the development of approximately 6 sheets of the 8 x 10 inch size without replenishment. This number can be increased up to approximately 25 sheets if replenisher is added in the usual manner.

The spacing between the inner wall of the vessel and the cylindrical wall of the drum may be kept narrower, if it is so desired, in order to reduce the required amount of developer even further. In the device having the approximate dimensions given hereinbefore, five to six 8 x 10 inch sheets can safely be developed in the first developing step of the said color process with one filling of fresh solution and without replenishment. As regards other processes or steps in a series of treating steps, the space provided between the cylindrical sheet and the inside wall surface of the upright vessel may be adjusted to provide the proper volume correlated to the capacity of the solution or liquid in question. Depending on the circumstance and the intended use, the vessel and the support may be designed and proportioned such that the space is as narrow as a few millimeters or it may be up to several centimeters if larger numbers of sheets are to be processed in one session without renewal or replenishment of the treating solutions.

Another way of providing varying amounts of treating liquid commensurate with the number of sheets which one desires to develop in one session may also be used. In accordance therewith the free space between the inside wall of the vessel and the convex outside of the cylindrical wall of the closed drum-type support is kept as narrow as feasible by suitable design of vessel and support and the varying needs of treating liquid are provided by filling the vessel to various (indicated and marked) levels. In this modification the height of the vessel is advantageously dimensioned somewhat more generously, exceeding the height of the cylindrical drum by one third up to one half or more.

The reactive layers of most photographic materials are sensitive to scratching and other mechanical action when they are swollen by aqueous processing solutions. It is therefore important that the surface of the cylindrical sheet is kept out of contact with the walls of the upright vessel while it is treated therein. This makes it desirable that the cylindrical support is securely supported and centered in the vessel preferably rotatably, for instance, by localizing and supporting the lower and the upper axle stumps of the cylindrical support in suitably located bearings. An embodiment of upper and lower bearings is shown in FIGS. 10 and 11 of the drawings. The lower bearing 54 is located in the center of the circular bottom 51 of the upright vessel and is part of and contained in horizontal bar 53 which is joined to bottom 51 of the vessel and which extends diametrically across the circular bottom from wall to wall of the vessel. The cylindrical bearing 54 is slightly larger in diameter than the cylindrical end of axle stump 14a of the cylindrical support and is designed to rotatably receive the end of the axle stump.

Another preferred modification of the lower bearing is shown in FIG. 13 which depicts a vertical section taken along the length axis of the upright vessel 55, along lines 15 of FIG. 12. Vessel 55 comprises circular bottom 51a and cylindrical wall 52a, with a closed drum-type support inserted therein in operating position. Bottom 51a of the vessel has in its center a cup-shaped cylindrical indentation 54a with vertical cylindrical wall 56 extending above and below bottom 51a. The upper portion of the cylindrical indentation 54a which is surrounded by circular wall 56 has been widened to an inverted frustoconical indenture which together with the lower cylindrical bore has the appearance, in cross section, of a funnel. This design of the lower bearing facilitates the insertion of the lower axle stump 14b, which upon insertion and upon contact with the conical wall section 57 readily slides into the cylindrical indentation or bearing 54a. The latter is slightly larger than the cylindrical end of axle stump 14b to permit ready rotation of the inserted axle stump 14b and of the closed drum-type support to which axle stump 14b is fixedly connected (in the center of the lower circular wall 12a of the closed cylindrical support). The photographic treating liquid contained in the vessel and thus also in the lower bearing acts as lubricant thus greatly facilitating any desired rotational movement of the drum-type support relative to the vessel wherein it is contained. The cylindrical wall 48a of the drum of this modification of the support is provided with rims 35a to accommodate the removable clamp described hereinbefore. Cylindrical wall 52a of vessel 55 is extended downwards below the bottom 51a and the lower bearing. The extension 58 of the wall 52a forms a ring which serves as the support for the vessel 55. The ring 58 has several perforations (not shown) to permit access and flow of liquid, surrounding the vessel, also underneath of the bottom of the vessel. The upper axle stump or shaft of the cylindrical support may be held in place and centered by a support and bearing arrangement as is shown in FIGS. 10 and 11. This arrangement comprises the flat horizontal member 61 which is flanged downwards on both ends to form vertical flanges 65. Midway between the flanges 65 an aperture 62 is provided which is dimensioned to rotatably receive section 63 of the upper axle stump or shaft, thus forming the upper bearing. The aperture 62 is narrower than the lower section 65 of the axle stump which is directly and fixedly connected to the center of the upper circular wall 11b of the drum-type support. The seat thus formed at the intersection of wider section 65 and narrower section 63 of the upper axle stump serves to prevent that supporting member 61 moves beyond the predetermined position toward the drum-type support while it is outside of the upright vessel.

The flanges 65 of the supporting member 61 rest, when the drum-type support is inserted in the vessel 50 as is shown in FIGS. 10 and 11, in pockets 66 which are provided on diametrically opposite portions of the upper cylindrical wall 52 near the top edge of the upright vessel. Pockets 66 are open at the top edge to permit ready insertion and removal of the ends of supporting member 61 with the flanges 65. The lower ends of the flanges 65 rest on the bottom portion of pockets 66. This arrangement assures that the upper supporting member 61 is securely localized in relation to the vessel 50 without impeding the ready insertion and removal of the drum-type support with the upper supporting and centering means including the upper bearing attached thereto.

Another modification of the upper centering and bearing arrangement is shown in FIGS. 12 and 13. Narrow, horizontal supporting member 84 is, turned on its narrow edge, inserted in slots 87 which are provided on diametrically opposite portions of the uppermost part of the vertical cylindrical wall 52a of vessel 55. The slots are open to the top to permit ready insertion and removal of the centering member. Triangular stops 86 are provided close to the ends of member 84 in a distance to fit close to the inside of cylindrical wall 52a of vessel 55. Midway between its ends member 84 is provided with a cylindrical bulge 85 with bore 62a in its center. As before, aperture 62a is wide enough to rotatably receive section 63a of the upper axle stump of the drum-type support but narrow enough to rest on the seat formed by the upper edge of the lower, wider section 67a of the axle stump. As can readily be seen also this centering and bearing arrangement is contained and attached to the drum-type support and does not interfere with the insertion and removal of the drum-type support into and from the vessel 55 and does permit rotation of the drum-type support relative to the vessel and assures that the drum is centered in the vessel 55 at all times.

The upper and lower centering and bearing arrangements have hereinbefore been demonstrated in combination with the drum type support and particularly with the closed drum-type support. They can likewise be employed with equal benefit with any other type of cylindrical support and particularly also with the star-shaped support described hereinbefore. Each of the described upper and lower centering and bearing arrangements may be used in combination with other arrangements and any desired modification may be made therein.

In an alternative construction of the lower bearing and centering means an axle stump may protrude vertically upwards from the center of the circular bottom of the upright vessel engaging rotatably in an indenture or in a cylindrical bore provided in or at the lower circular face of the drum-type or other cylindrical support to be inserted in the vessel.

The upper end of the axle or the upper axle stump of the cylindrical support may be provided with a lever which is fixedly and preferably removably mounted thereto. Actuation of the lever by hand or by connection to a rotating or reciprocating power source gives the cylindrical support and the cylindrical sheet mounted therein a continuous or a reciprocating rotational motion within the treating liquid contained in the upright vessel. The rotation may be unidirectional and if desired continuous or intermittent. An intermittent, unidirectional motion may be brought about, for instance, by the provision of a gear, sprocket wheel or of special modifications of these elements which are mounted or inserted onto the upper end of the axle or axle stump, respectively, and which may be driven by belts or chains and similar means passing by the said driving means.

Particularly suited driving means are shown in FIGS. 10 and 11 of the drawings. The modified sprocket wheel comprises four rods or sprockets 71, 71a, 71b and 71c which are radially mounted in the center wheel base 68 at right angles to each other. Wheel base 68 has in its center a rectangular upper aperture which fits slidably over the rectangular upper section 64 of the upper axle stump of the drum-type support. Endless belt 75, of which only a section is shown in FIG. 10 travels in the direction indicated by the arrow closely underneath the bars or sprockets. Protrusions 76 and 77 are mounted on the upper side of the belt extending in between the rods or sprockets. As the belt travels in the indicated direction protrusion 76 contacting rod or sprocket 71 pushes it forwards and causes the modified sprocket wheel to which it belongs and the drum-type support to rotate around their length axis. When the protrusion has travelled past the point where it makes contact with the rod or sprocket 71 the rotational motion temporarily stops. Protrusion 77, next on the belt, then engages by contacting rod or sprocket 71a, thus continuing the rotational motion of the drum-type support and the cylindrical sheet contained thereon, until it loses contact and the next protrusion engages in the next rod or sprocket and so forth. Depending on the spacing of the protrusions on the belt in relation to the length of the individual rods or sprockets the rotational motion will be continous or nearly so, or it will be intermittent, for instance, if only a few protrusions are provided on the belt in relatively wide spacing. Generally, the spacing of the protrusions need not be less than the distance from the tip of the rod or sprocket to that of the next. The spacing of the protrusions may be uniform from one protrusion to the next or it may be varying depending on the desired effect. The sector by which the cylindrical support is rotated by each contact with a protrusion can be readily controlled by varying the length of the rods or sprockets correspondingly, shorter length giving a smaller section of rotation and vice versa. The rate of travel of each point of the periphery of the cylindrical support and of the cylindrical sheet contained thereon may also be adjusted by controlling or varying the rate of travel of the belt. The combination of these variables, number of rods or sprockets in the sprocket wheel, length of the individual rod or sprocket, number and spacing of the protrusions on the belt and rate of travel of the belt permit absolute control of the relative movement of the surface of the cylindircal sheet material in the treating liquid to create for each material and for each treating solution the most favorable treating conditions.

An embodiment of the above-mentioned star-shaped gear is depicted in a top plan view in FIG. 12, and in vertical section in FIG. 13. The latter is taken along lines 15 of FIG. 12. Gear 80 comprises six teeth 82, evenly spaced and arranged around the circular central section of the gear. The point of each of the teeth 82 is connected with the point of each of the neighbouring teeth by the concave curved sections 83 thus producing the characteristic star-shaped appearance of the gear.

The center of the gear is provided with a rectangular aperture which slidably fits over the upper, rectangular section 64a of the upper axle stump or shaft of the drum-type support. Gear 80 has, at its underside, rim 88 which encircles the central, circular portion of the gear concentrically. When the gear is attached to the cylindrical support and both are inserted in operating position in the upright vessel 55, circular rim 88 overlaps and surrounds the upper portion of the cylindrical wall 52a leaving a gap or space between them as not to interfere with the rotation of the gear and the cylindrical support to which it is connected or attached. The rim serves to exclude light from the inside of the vessel thus protecting the photographic material being treated therein from undesired stray-light.

Belt 75a which is provided with protrusions on its upper side is travelling underneath the star-shaped gear, out of contact, however, in close proximity to the gear to permit contact of the protrusions 78 with the curved sections 83 of the gear 80. As described hereinbefore, the travelling protrusions push the gear teeth forward and cause any desired continuous or intermittent unidirectional rotational movement of the cylindrical support connected to the gear. The stroke or sector of each component of the motion and the relative rate of travel of the surface of the cylinder wall of the support can be readily controlled by proportional dimensioning of the radius of the individual gear teeth, the number of the teeth on any one gear, the number and the spacing of the protrusions on the belt and the rate of travel of the belt. In order to reduce friction between the travelling protrusions and the star-shaped gear roller 79 is mounted rotatably on or around protrusion 78.

Continuous unidirectional motion of the cylindrical support around its rotational axis may also be brought about by the provision of a regular gear, sprocket wheel, friction gear or similar means on the upper end of the axle or on the upper axle stump respectively which may engage in positively driven gear, geared belt, chain or similar driving means.

All these methods cause the movement of the photographic cylindrical sheet relative to the stationary vessel and treating liquid contained therein, which is in most instances the most desirable manner for the production of uniform, reproducible results. As will be shown hereinafter, the process and apparatus of the invention may also be modified in such manner that the *cylindrical* sheet of photographic material is kept stationary while the treating liquid and/or the vessel containing it is moved relative to the stationary cylindrical sheet.

The simple, automatic actuation of the cylindrical sheet relative to the treating liquid or of the treating liquid relative to the sheet relieves the operator from paying any attention to this part of the process. Furthermore, by proper design and proportioning of the driving and driven means a predetermined rate of relative movement is achieved which will be uniform from operation to operation. Thus the expedient of providing automatic actuation, as described hereinbefore, does not only simplify the processing of the photographic sheet material but provides also the utmost in reproducibility from sheet to sheet and from day to day, eliminating a source of inconsistency which is always present in the uncontrolled tray method.

If the upright vessel has an inner diameter which exceeds that of the outer periphery of the cylindrical sheet only slightly, there is the danger that upon insertion or removal of the cylindrical sheet into or from the vessel the soft, swollen surface of the sheet material is scratched or otherwise damaged by contact with the parts of the cylindrical wall of the vessel, particularly with the upper edge of the vessel. This danger is greatly reduced by the presence of one or two rims on one or both ends of the cylindrical support as has been shown, for instance, in FIG. 4 (rims 18 and 19), in FIG. 5 (rim 18b), in FIG. 6 (rim 35), in FIGS. 10 and 11 (rims 18a and 19a) and in FIGS. 12 and 13 (rims 35a). Generally, the rims have a slightly larger outer diameter than the cylindrical sheet, which is, however, slightly smaller than the inside diameter of the cylindrical wall of the upright vessel, if such is used. Another factor in reducing the danger of damaging the surface of the cylindrical sheet is found in the utilization of the outer edge of the removable clamp or means used to fasten the clamp or clips to the cylindrical support, if the clamp or clips are contained recessed between the rims on the underside of the holding means. So for instance, may the upper edge of clamp 40 in FIG. 6, or in the alternative, if the clamp 40 is contained on the underside of band 27, the outer side of band 27, be used as a guide for sliding the cylindrical support over the upper edge of the upright vessel. At the same time the diametrically opposite portion of the lower rim may serve as a guide to slide the support down or up along the opposite side of the inside wall of the vessel. Thus contact of the cylindrical sheet, which is recessed between the rim, with the wall or any part of the vessel is positively prevented and virtually impossible.

Heretofore, the cylindrical upright vessel has been described, which permits the utmost economy in the consumption of processing liquids. This modification of the invention requires also the minimum of working area or floor space for a given size of the sheet material. Another modification of the container for the treating liquid may, in accordance with the present invention, be employed in conjunction with the cylindrical sheet if economy with regard to the amounts of processing liquid required and working space are not of such great importance. This modification of the container comprises substantially one half of a cylinder, cut along the cylinder axis and closed at both ends by two facing walls forming half circles and many modifications derived therefrom. This trough-like version of the container is oriented such that the cylinder axis is lying in a horizontal or substantially horizontal position. Similarly as in the upright cylindrical version of the vessel, the diameter of the half cylinder is at least slightly larger than the diameter of the cylindrical sheet or its cylindrical support which is to be accommodated therein. The axis of the cylindrical sheet, when it is contained in the trough is likewise in horizontal position and preferably falls together with the cylinder axis of the half cylinder. It is apparent from the foregoing that the cylindrical sheet is only partially submerged in the treating liquid when contained in the short form of the trough, in operating position. Rotation of the cylindrical sheet in the trough around its cylinder axis brings successive portions of the cylindrical sheet in contact with the treating liquid contained in the tray.

In order to avoid splashing of the treating liquid or, to enable one to fill the trough with the treating liquid to a level which permits complete submersion of the cylindrical sheet, another version of the horizontal trough-like container is used with advantage which trough is primarily characterized by a vertical upward extension of its confining walls.

This modification of the trough-like container, which will be called hereinafter "horizontal trough" is shown in FIGS. 14 to 16 of the accompanying drawings. FIG. 14 is a sectional view of the horizontal trough, with a cylindrical drum-type support inserted, cut vertically in the plane of the horizontal length axis. FIG. 15 is a transverse vertical section of the trough of FIG. 14 taken along lines 17. Trough 90 comprises the cylindrical wall section 91 which forms exactly one half of a cylinder with its open coaxial plane being at the top. Each side of the cylindrical wall (parallel to the length axis) is extended vertically upwards to form wall sections 92. Each wall section 92 is flanged at the top to form horizontal flanges 93. Both circular ends of the extended half-cylinder are joined with side walls 95 which extend to the height of flanges 93 and which are likewise flanged to form flanges 94. The closed trough formed by these wall sections has, viewed from the top, a rectangular outline with a rounded, cylindrical bottom of a width equalling the diameter of the lower half-cylinder. The flanges 93 and 94 serve as the supports for suspending the trough in suitable supporting means (not shown).

Inside the trough, supporting members 96 with vertical slots 97 at their upper end are joined to the wall sections 95 such that the lower end of each of slots 97 nearly coincides with the axis of the lower half of the cylinder or with the center of the lower half-circular portions of wall sections 95, respectively. The slots 97 are wide enough to rotatably receive the ends of axle 101 of cylindrical support 100 thus forming a bearing for the cylindrical support wherein the latter may be rotated or rotatably reciprocated with the treating liquid contained in the trough acting as the lubricant. The upper ends of slots 97 may be widened to form a wedge-shaped slot with the bottom portion being slightly wider than the diameter of the ends of axle 101. This modification generally facilitates insertion of the cylindrical support into the bearings (not shown).

Cylindrical support 100, shown in inserted position, is of the closed drum-type, having a plain cylindrical surface with no rims. To the upper portion of the right circular wall of support 100 is joined lever or crank 106 with crank pin 107 contained in its upper end. Lever or crank 106 may be actuated by hand or by connecting crank pin 107 with a reciprocating power source to give the cylindrical support and the cylindrical sheet contained thereon (not shown) a reciprocating rotational motion. The extreme right position of lever or crank 106 is indicated in FIG. 15 by dotted lines. The crank is designated by numeral 106; with crank pin 107'. Two handles 102 and 104 are loosely and rotatably contained on axle 101 of the cylindrical support. They are held in place by discs 108 which are concentrically contained and fastened to axle 101 with a space between them to accommodate the handle 102 and 104, respectively, with sufficient play not to intefere with their rotatability. Both handles 102 and 104 are flanged at the top to form gripping means 103 and 105, respectively, which facilitate the holding of the handles by hand for the insertion and removal of the cylindrical support into and from the horizontal trough. The handles are normally, during operation of the process and apparatus of the invention, leaned against the upper, inner edge of wall section 92 where they do not interfere with the operation.

As can be readily seen, in the just described modification of the horizontal trough the cylindrical support with the cylindrical sheet contained thereon may be completely immersed in the processing solution by filling the trough to the proper level. In either the low or the high form of the horizontal trough any of the cylindrical supports described hereinbefore or any other desired modification thereof may be used with advantage. As in the vertical version of the vessel, the upright vessel, the closed drum-type support will also in the horizontal trough permit operation with considerably smaller amounts of processing liquids than are required with the open drum-type or with the open star-shaped cylindrical support. The ends of the axle or axle stumps of any of the cylindrical supports can be inserted in slots or bearings 97 as has been shown hereinbefore with respect to the closed drum-type support. This arrangement will ensure alignment of the cylindrical sheet, when inserted in operating position in the trough, such that the cylindrical sheet is evenly spaced from the half-cylindrical wall in all places, preventing contact of the soft active layer of the photographic material with any part of the trough. The space between the inside cylindrical wall portion and the surface of the cylindrical sheet may be narrow, from a few millimeters to several centimeters or more, depending on the side of the sheet material to be processed and the amount of treating liquid required or desired in the specific process carried out in the trough. If desired, the support may be made adjustable permitting the cylindrical sheet to be inserted in a lower or higher position than the coaxial, central position described above. Rims, means for fastening the cylindrical sheet to the cylindrical support etc. may be provided as has been described hereinbefore.

It is generally preferred that the cylindrical support, when inserted in the horizontal trough, may be rotated. The rotational motion may be continuous or intermittent, unidirectional or reciprocating, depending on the nature and requirements of the process and materials treated in the trough. Reciprocating, rotational movement of the cylindrical sheet relative to the treating liquid contained in the trough may be created by the provision of a lever or crank at one of the circular faces of the cylindrical support or on its axle or axle stump as has been described hereinbefore.

If a unidirectional rotational motion of the cylindrical sheet is desired in the trough a gear may be provided at one end of the axle or axle stump which by engagement with a positively driven gear or geared belt permits rotation of the cylindrical support and of the cylindrical sheet contained thereon. A modification of the horizontal trough utilizing the gear is shown in FIG. 16 of the accompanying drawings, which is a vertical section of a portion of the horizontal trough taken along the plane of the central length axis. The trough is formed as before by wall sections 91a, 92a and 95a with upper horizontal flanges 93a and 94a as the supports for the trough. Cylindrical support 100a which is of the closed drum-type is rotatably suspended in slot-like bearing 97a by the ends of its rotational axle 101a. Slot 97a is contained, concentrically with the circular lower portion of wall section 95a, in supporting member 96a. As before, handle 104a with flanged end 105a as the gripping means is loosely and rotatably contained on axle 101a of the cylindrical support. Gear 110 is likewise concentrically contained on axle 101a and is joined to the circular face of the drum-type support 100a. The gear 110 is of a diameter larger than the height of the trough. To accomodate its excessive diameter in the trough the vessel has been provided with a bulge 109a all around the half-cylindrical wall 91a and its extensions 92a. Though the gear or similar driving means may have about the same or a smaller diameter than the cylindrical support, certain advantages are associated with a design wherein the gear has a considerably larger diameter as has been shown in FIG. 16. This construction brings the top portion of the gear outside of the tray so that a belt or chain or similar means which pass over the trough may engage and drive the gear and thus rotate or reciprocate the cylindrical support and the cylindrical sheet contained thereon. If a gear 110 of smaller size is used rotational motion of the cylindrical support may be provided by a second positively driven gear which is mounted in a position above said first gear. In order to permit ready removal of the cylindrical support from the trough, the positively driven gear may be designed such that it can be readily swung out of the way or into the engaging position, as the case may be e.g. by the provision of a cross-coupling in its driving axle.

As stated hereinbefore, instead of moving or rotating the cylindrical sheet and the cylindrical support relative to the stationary container the upright vessel or the horizontal trough or other container, with the processing liquid contained therein, may be actuated or moved relative to the cylindrical sheet. The motion of the container may be continuous or intermittent. It may be in a vertical direction or, in the case of the upright cylindrical vessel, rotational around the cylinder axis. The former may be a vertical up and down motion.

Even a relatively short stroke of, for instance, a fraction of an inch or one or two inches will provide sufficient turbulence in the treating liquid to bring continuously new portions of the treating liquid in contact with each area of the photographic sheet material. This is particularly the case when the closed drum-type cylindrical support is used. With the latter, because of its effectiveness, intermittent motion every 20 seconds or so will permit the uniform treatment of sheets of any desired size in the treating liquid, permitting in many cases excellent, flawless results. The clips or clamps attached to the cylindrical support, and particularly the raised type containing the elevated sliding bar, assist in the creation of sufficient turbulence to bring continuously new portions of the treating liquid in contact with the surface of the photographic sheet material.

In general, the method and design of apparatus involving the movement of the cylindrical sheet relative to a stationary treating bath are preferred because they give the possibility of better control and because they require generally simpler and less expensive construction.

In any of the methods described for actuating the cylindrical sheet relative to the treating liquid or vice versa the exchange of chemicals or their deposition or the removal of chemicals from the active layer or layers of the photographic sheet material can be achieved in well controlled manner by adjusting the rate of relative motion to the specific requirements of the process and materials used in each instance. Once the optimum rate of movement or motion has been found or established in a given apparatus and process it can be readily maintained in absolutely the same level and effectiveness and complete reproducibility of the process and consistency of the results are assured.

If in accordance with the invention more than one vessel or trough, with the cylindrical sheets inserted therein is connected to a single power source, each container may still have its individual, optimum rate of relative motion or movement depending on the requirements of the particular processing step carried out therein. This may be accomplished by proper dimensioning and adjustment of the driving means, for instance, by varying the number of teeth in the individual gear, by varying the diameter of the star-shaped gear or by other suitable means well known to the skilled mechanic.

I claim:
1. A method for the treatment of photographic paper-backed sheet material with a photographic treating liquid, which method comprises the step of placing the sheet in form of a partial cylinder, having at least one reactive layer on its concave side, onto a rotatable cylindrical support, having an essentially horizontal cylinder axis, the step of rotating said cylindrical support unidirectionally around its cylinder axis, while holding said cylindrical sheet stationary, and the step of contacting said reactive layer on the concave side of said sheet with said treating liquid and moving the treating liquid relative to said stationary sheet and reactive layer, such that all areas of the concave side of said sheet are contacted by said treating liquid for uniform treatment of all areas of the reactive layer.

2. The method of claim 1, in which said treating liquid is moved to and by the concave side of said sheet by the generation of surface forces on the convex side of said cylindrical support by providing thereon a plurality of surface modifications selected from protrusions and indentations, the size of which surface modifications being small in relation to the size of said support, such that the treating liquid diffuses and penetrates between the areas of contact of the concave side of said sheet with the raised portions of said surface modified cylindrical wall for access to all areas of the concave side of the sheet.

3. The method of claim 2, in which the treating liquid is uniformly distributed over the convex surface of said cylindrical support by arranging the protrusions or indentations in a pattern of rows, each of which rows containing a plurality of said small protrusions or indentations for uniform treatment of all areas of said reactive layer on the concave side of said sheet.

4. The method of claim 3, in which said surface forces are generated by the presence of small welts on the cylindrical surface of the said cylindrical support.

5. The method of claim 3, in which said surface forces are generated by the presence of small dot-like structures on the cylindrical surface of the said cylindrical support.

6. An apparatus for the treatment of photographic paper-backed sheet material with a photographic treating liquid, which apparatus comprises a drum-type cylindrical support, having an outer solid cylindrical wall and being rotationally mounted in a supporting structure with its cylinder axis in essentially horizontal orientation for rotation around its cylinder axis, driving means for unidirectional rotation of said drum-type support; means for holding stationary in said apparatus and in contact with said rotatable cylindrical wall surface a partially cylindrical paper-backed photographic sheet having at least one reactive layer on the concave side; and means for containing said treating liquid in contact with said drum-type support; wherein surface modifications are provided on the convex side of said cylindrical wall of the drum-type support of a size small in relation to the size of the drum, such that the treating liquid penetrates between the areas of contact of the concave side of said stationary partially cylindrical sheet with said rotational support for uniform treatment of said sheet, when it is contained on the drum-type support for treatment.

7. The apparatus of claim 6, wherein said surface modifications on the convex side of said cylindrical wall are structures selected from a plurality of protrusions and a plurality of indentations, forming a pattern of said structures, which are arranged in adjacent, vicinal rows, each row containing a plurality of said structures, the size of which structures is small in relation to the size of said support, such that the treating liquid penetrates between the areas of contact of the concave side of said partially cylindrical sheet with said cylindrical wall of said support for uniform treatment of said concave side of said stationary sheet, when it is contained on the drum-type support for treatment.

8. The apparatus of claim 7, wherein the said rows of protrusions or indentations wind helically around the convex surface of the cylindrical wall of said drum-type support.

9. The apparatus of claim 7, wherein said protrusions are a plurality of small welts.

10. The apparatus of claim 7, wherein the said protrusions are a plurality of dot-like structures.

References Cited

UNITED STATES PATENTS

| | | | |
|---|---|---|---|
| 920,263 | 5/1909 | Burton | 95—90.5 |
| 2,638,829 | 5/1953 | Singer | 95—100 |
| 3,054,341 | 9/1962 | Wolber | 95—100 |

FOREIGN PATENTS 740,355  10/1943  Germany.

JOHN M. HORAN, Primary Examiner

R. P. GREINER, Assistant Examiner

U.S. Cl. X.R.

95—90.5, 100